(12) United States Patent
Thorson et al.

(10) Patent No.: US 11,279,882 B2
(45) Date of Patent: Mar. 22, 2022

(54) HYDROTHERMAL LIQUEFACTION SYSTEM

(71) Applicant: Battelle Memorial Institute, Richland, WA (US)

(72) Inventors: Michael R. Thorson, Richland, WA (US); Lesley J. Snowden-Swan, Ellensburg, WA (US); Andrew J. Schmidt, Richland, WA (US); Todd R. Hart, Kennewick, WA (US); Justin M. Billing, Richland, WA (US); Daniel B. Anderson, Pasco, WA (US); Richard T. Hallen, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/740,339

(22) Filed: Jan. 10, 2020

(65) Prior Publication Data
US 2021/0214633 A1    Jul. 15, 2021

(51) Int. Cl.
*C10G 1/06* (2006.01)
*C10L 3/08* (2006.01)

(52) U.S. Cl.
CPC .............. *C10G 1/065* (2013.01); *C10L 3/08* (2013.01); *C10G 2300/1011* (2013.01);
(Continued)

(58) Field of Classification Search
None
See application file for complete search history.

(56) References Cited

U.S. PATENT DOCUMENTS 9,404,063 B2    8/2016  Elliott et al.
9,758,728 B2    9/2017  Elliott et al.
(Continued)

FOREIGN PATENT DOCUMENTS

CN    209759383 U    12/2019
EP      3428130 A1    1/2019

OTHER PUBLICATIONS

Towler et al. "Chapter 19: Heat-Transfer Equipment" Chemical Engineering Design—Principles, Practice, and Economics of Plant and Process Design (2nd Edition) Elsevier. 2013. pages 1047-1129 (Year: 2013).*

(Continued)

*Primary Examiner* — Philip Y Louie
(74) *Attorney, Agent, or Firm* — Klarquist Sparkman, LLP

(57) ABSTRACT

A hydrothermal liquefaction (HTL) system can comprise a biomass slurry source, a first pump in fluid communication with the slurry source and configured to pressurize a biomass slurry stream from the slurry source to a first pressure, a first heat exchanger in fluid communication with the first pump and configured to heat a slurry stream received from the first pump to a first temperature, a second pump in fluid communication with the first heat exchanger and configured to pressurize a slurry stream received from the first heat exchanger to a second pressure higher than the first pressure, a second heat exchanger in fluid communication with the second pump and configured to heat a slurry stream received from the second pump to a second temperature higher than (Continued)

the first temperature, and a HTL reactor configured to produce biocrude from a slurry stream received from the second heat exchanger.

21 Claims, 5 Drawing Sheets

(52) U.S. Cl.
CPC ... *C10L 2200/0469* (2013.01); *C10L 2290/06* (2013.01); *C10L 2290/46* (2013.01); *C10L 2290/543* (2013.01)

(56) References Cited

U.S. PATENT DOCUMENTS

| 10,167,430 | B2 | 1/2019 | Hart et al. | |
|---|---|---|---|---|
| 2013/0160683 | A1 | 6/2013 | Dickinson et al. | |
| 2015/0259606 | A1* | 9/2015 | Iversen | C10G 3/40 |
| | | | | 585/240 |
| 2016/0186073 | A1* | 6/2016 | Powell | C07C 45/00 |
| | | | | 549/295 |
| 2018/0273850 | A1 | 9/2018 | Bhujade et al. | |
| 2019/0016961 | A1 | 1/2019 | Chandran et al. | |
| 2019/0071606 | A1 | 3/2019 | Elliott et al. | |

OTHER PUBLICATIONS

Ong et al. A heat- and mass-integrated design of hydrothermal liquefaction process co-located with a Kraft pulp mill. Energy 189 (2019) pp. 1-12 (Year: 2019).*
Qian et al. "Hydrothermal liquefaction of sewage sludge under isothermal and fast conditions" Bioresource Technology 232 (2017) 27-34. Elsevier. (Year: 2017).*
Towler, Gavin Sinnott, Ray K.. (2013). Chemical Engineering Design—Principles, Practice and Economics of Plant and Process Design (2nd Edition)—3.2.4 Hot Oil and Heat Transfer Fluids. Elsevier. (Year: 2013).*
Berglin et al., "Review and Assessment of Commercial Vendors/ Options for Feeding and Pumping Biomass Slurries for Hydrothermal Liquefaction," *Pacific Northwest National Laboratory, as prepared by the U.S. Department of Energy*, Nov. 2012, 94pps.
Castello et al., "Continuous Hydrothermal Liquefaction of Biomass: A Critical Review," *Energies*, 11:3165, Nov. 15, 2018, 35pps.
Knorr et al., "Production of Advanced Biofuels via Liquefaction," *National Renewable Energy Laboratory*, Apr. 5, 2013, 90pps.
International Search Report and Written Opinion for PCT/US2021/ 012111, dated Mar. 8, 2021, ISA United States Patent and Trademark Office, 11 pages.

* cited by examiner

HYDROTHERMAL LIQUEFACTION SYSTEM

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

The present disclosure relates to hydrothermal liquefaction systems and methods of converting organic matter or biomass into biocrude oils and gases.

SUMMARY

Certain embodiments of the disclosure pertain to hydrothermal liquefaction systems including multiple pumps and heat exchangers that pressurize and heat a biomass slurry stream to a specified reactor temperature and pressure in a series of steps. In a representative embodiment, a system comprises a biomass slurry source, and a first pump in fluid communication with the biomass slurry source and configured to pressurize a biomass slurry stream from the biomass slurry source to a first pressure. The system further comprises a first heat exchanger in fluid communication with the first pump and configured to heat a biomass slurry stream received from the first pump at the first pressure to a first temperature. The system further comprises a second pump in fluid communication with the first heat exchanger and configured to pressurize a biomass slurry stream received from the first heat exchanger to a second pressure that is higher than the first pressure. The system further comprises a second heat exchanger in fluid communication with the second pump and configured to heat a biomass slurry stream received from the second pump at the second pressure to a second temperature that is higher than the first temperature. The system further comprises a hydrothermal liquefaction (HTL) reactor in fluid communication with the second heat exchanger and configured to produce biocrude from a biomass slurry stream received from the second heat exchanger.

In any or all of the disclosed embodiments, the first pressure is from 500 psi to 1,500 psi and the first temperature is from 300° F. to 600° F.

In any or all of the disclosed embodiments, the first heat exchanger comprises a shell and a plurality of tubes disposed in the shell, an inner diameter of the tubes is from 0.5 inch to 2 inches, and a viscosity of the biomass slurry stream received from the first pump is from 300 cP to 20,000 cP such that flow of the biomass slurry in the tubes is laminar.

In any or all of the disclosed embodiments, the first pump is a slurry pump configured to pump a biomass slurry mixture comprising 15% solids to 30% solids in water.

In any or all of the disclosed embodiments, the second pressure is 2,500 psi to 3,500 psi and the second temperature is 400° F. to 700° F.

In any or all of the disclosed embodiments, the second heat exchanger comprises a shell and a plurality of tubes disposed in the shell, an inner diameter of the tubes is from 0.25 inch to 0.5 inch, and a viscosity of the biomass slurry stream received from the second pump is 200 cP or less such that flow of the biomass slurry in the tubes is turbulent.

In any or all of the disclosed embodiments, the second pump is configured to pump abrasive slurries at a temperature of 200° F. or greater.

In any or all of the disclosed embodiments, the second heat exchanger is configured to receive a product mixture stream from the HTL reactor to heat the biomass slurry stream received form the second pump in the second heat exchanger, and the first heat exchanger is configured to receive the product mixture stream from the second heat exchanger to heat the biomass slurry stream received from the first pump in the first heat exchanger.

In any or all of the disclosed embodiments, the second heat exchanger is configured to receive the product mixture stream from the HTL reactor at a temperature of 400° F. to 700° F., and the first heat exchanger is configured to receive the product mixture stream from the second heat exchanger at a temperature of 300° F. to 600° F.

In any or all of the disclosed embodiments, the system further comprises a third heat exchanger configured to receive a product mixture stream from the HTL reactor to heat a heat transfer liquid, the second heat exchanger is in fluid communication with the third heat exchanger and configured to receive a heat transfer liquid stream from the third heat exchanger to heat the biomass slurry stream received form the second pump, and the first heat exchanger is in fluid communication with the second heat exchanger and configured to receive a heat transfer liquid stream from the second heat exchanger to heat the biomass slurry stream received from the first pump.

In another representative embodiment, a method comprises pressurizing a biomass slurry stream from a biomass slurry source to a first pressure and, in a first heat exchanger, heating the biomass slurry stream at the first pressure to a first temperature. The method further comprises pressurizing the biomass slurry stream at the first temperature to a second pressure that is greater than the first pressure and, in a second heat exchanger, heating the biomass slurry stream at the second pressure to a second temperature that is greater than the first temperature. The method further comprises producing biocrude from the biomass slurry stream.

In any or all of the disclosed embodiments, pressurizing the biomass slurry stream to the first pressure further comprises pressurizing the biomass slurry stream to a first pressure of 500 psi to 1,500 psi with a slurry pump.

In any or all of the disclosed embodiments, heating the biomass slurry stream to the first temperature further comprises flowing the biomass slurry stream through the first heat exchanger at the first pressure to heat the biomass slurry stream to a temperature of 300° F. to 600° F.

In any or all of the disclosed embodiments, the first heat exchanger comprises a shell and a plurality of tubes disposed in the shell, an inner diameter of the tubes is from 0.5 inch to 2 inches, and flowing the biomass slurry stream through the first heat exchanger further comprises flowing the biomass slurry stream at a viscosity of 300 cP to 20,000 cP such that flow of the biomass slurry stream in the tubes is laminar.

In any or all of the disclosed embodiments, pressurizing the biomass slurry stream at the first temperature to the second pressure further comprises pressurizing the biomass slurry stream to a second pressure of 2,500 psi to 3,500 psi.

In any or all of the disclosed embodiments, heating the biomass slurry stream to the second temperature further comprises flowing the biomass slurry stream through the second heat exchanger at the second pressure to heat the biomass slurry stream to a second temperature of 400° F. to 700° F.

In any or all of the disclosed embodiments, the second heat exchanger comprises a shell and a plurality of tubes disposed in the shell; an inner diameter of the tubes is from 0.25 inch to 0.5 inch; and flowing the biomass slurry stream through the second heat exchanger further comprises flowing the biomass slurry stream at a viscosity of 200 cP or less such that flow of the biomass slurry stream in the tubes is turbulent.

In any or all of the disclosed embodiments, producing biocrude from the biomass slurry stream further comprises producing biocrude with a hydrothermal liquefaction (HTL) reactor, heating the biomass slurry stream at the second pressure to the second temperature further comprises flowing a product mixture stream from the HTL reactor through the second heat exchanger, and heating the biomass slurry stream at the first pressure to the first temperature further comprises flowing a product mixture stream from the second heat exchanger through the first heat exchanger.

In any or all of the disclosed embodiments, producing biocrude from the biomass slurry stream further comprises producing biocrude with a hydrothermal liquefaction (HTL) reactor, and the method further comprises flowing a product mixture stream from the HTL reactor through a third heat exchanger configured to heat a heat transfer liquid, flowing the heat transfer liquid from the third heat exchanger through the second heat exchanger to heat the biomass slurry to the second temperature, and flowing the heat transfer liquid from second heat exchanger through the first heat exchanger to heat the biomass slurry stream to the first temperature.

In another representative embodiment, a hydrothermal liquefaction system comprises a first liquid circuit comprising a biomass slurry source, a first pump in fluid communication with the biomass slurry source and configured to pressurize a biomass slurry stream from the biomass slurry source to a first pressure, a first heat exchanger in fluid communication with the first pump and configured to heat a biomass slurry stream received from the first pump at the first pressure to a first temperature, a second pump in fluid communication with the first heat exchanger and configured to pressurize a biomass slurry stream received from the first heat exchanger to a second pressure that is higher than the first pressure, a second heat exchanger in fluid communication with the second pump and configured to heat a biomass slurry stream received from the second pump at the second pressure to a second temperature that is higher than the first temperature, and a hydrothermal liquefaction (HTL) reactor in fluid communication with the second heat exchanger and configured to produce biocrude from a biomass slurry stream received from the second heat exchanger. The hydrothermal liquefaction system further comprises a second liquid circuit comprising a third heat exchanger configured to receive a product mixture stream from the HTL reactor to heat a heat transfer liquid, the third heat exchanger being in fluid communication with the second heat exchanger and the first heat exchanger in series to heat the biomass slurry streams in the first liquid circuit with the heat transfer liquid.

The foregoing and other objects, features, and advantages of the disclosed technology will become more apparent from the following detailed description, which proceeds with reference to the accompanying figures.

DETAILED DESCRIPTION

Figure 1:
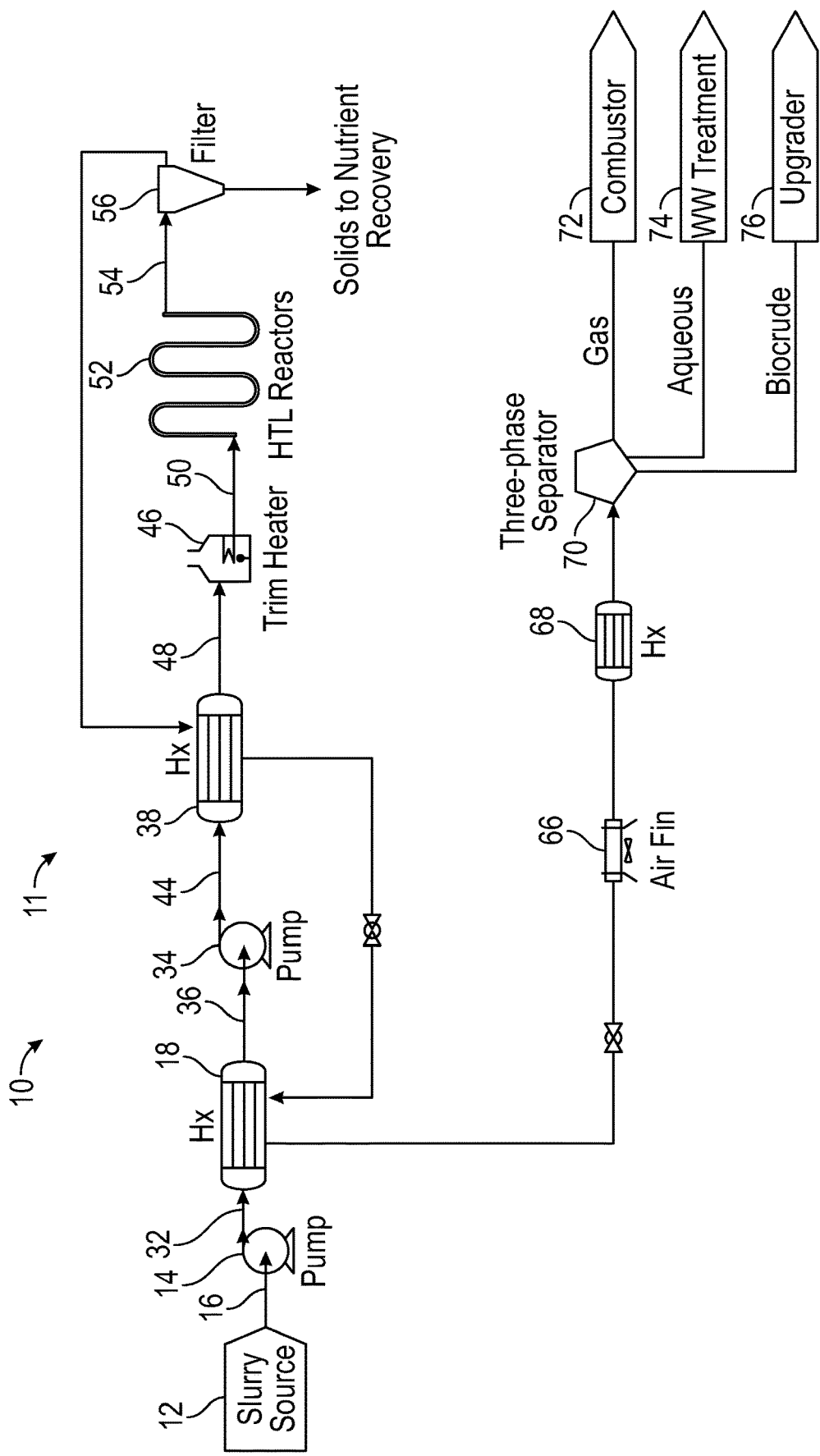
FIG. 1 is a schematic diagram of a hydrothermal liquefaction system where a biomass slurry stream is pressurized and heated in multiple steps, according to one embodiment.

Hydrothermal liquefaction (HTL) is a process that employs a pressurized hot water reaction environment in a reactor to thermochemically convert feedstocks containing organic materials and/or biomass into biocrude oils and gases. In existing systems, biomass feedstocks are typically provided as a slurry, which must be heated and pressurized to the relatively high temperature and pressure at which the HTL reaction(s) take place. Thus, existing systems first pressurize the biomass slurry to the pressure required by the reactor, then heat the pressurized slurry in one or more heat exchangers. In a typical system, this can require pressurizing a viscous slurry at ambient temperature to 3,000 psi (207 bar) or greater, then heating the pressurized slurry in one or more heat exchangers to 600° F. (315° C.) or greater. Such systems require robust pumps that can pump viscous, abrasive slurries to high pressures. Additionally, heat exchangers that can accommodate abrasive slurries at such high pressure and viscosity, and heat them to such high temperatures, are difficult and expensive to manufacture, suffer from poor thermal efficiency, and result in high pressure drops. Accordingly, there exists a need for improved systems and methods of HTL production of biocrude.

Certain embodiments of the disclosure pertain to hydrothermal liquefaction (HTL) systems and associated methods of converting biomass or organic matter to biocrude oils and gases. In particular, certain embodiments pertain to flow circuit configurations in which pressurization and heating of the biomass slurry feedstock to the specified reactor temperature and pressure occurs in multiple steps to account for changes in the viscosity of the biomass slurry. The viscosity of the biomass slurry stream can change significantly as it is pressurized and heated. For example, in certain embodiments the viscosity of the biomass slurry at ambient temperature can be relatively high (e.g., 300 cP to 20,000 cP) (0.3 pa·s to 20 pa·s), making pumping difficult and resulting in a relatively high pressure drop across fluid circuit components such as heat exchangers. However, once heated and pressurized to the specified reactor temperature and pressure (e.g., 630° F. and 3,100 psi in certain embodiments), the biomass slurry can exhibit a significantly lower viscosity, which can be comparable to that of water (e.g., 0.9 cP). This can result in significantly reduced pumping requirements, reduced pressure drops across downstream components of the flow circuit, and increased heat transfer efficiency.

The HTL systems and flow circuits described herein pressurize and heat the biomass slurry in multiple discrete steps. For example, rather than pressurizing the cold biomass slurry to the specified reactor pressure (or beyond) before heating, certain embodiments of the systems described herein pressurize the biomass slurry to an intermediate pressure, then heat the pressurized biomass slurry to an intermediate temperature which can correspond to a specified viscosity of the biomass slurry. Being more amenable to pumping, the heated, pressurized, reduced viscosity biomass slurry can then be further pressurized and/or heated in one or a series of additional steps to the specified reactor temperature and pressure. The discretized pressurization and heating can allow each of the pumps and heat exchangers of the system to be configured for handling the biomass slurry for specific, narrower temperature, pressure, and/or viscosity ranges than existing systems, resulting in increased pumping and thermal efficiency, and significantly reduced cost.

FIG. 1 illustrates a representative embodiment of a HTL reactor system 10, according to one embodiment. The system 10 can comprise a liquid circuit 11 including a biomass slurry source 12 in fluid communication with a first pump 14. The biomass slurry source 12 can be, for example, a tank, a reservoir, or other storage containing a liquid feedstock comprising particulates of organic matter suspended in an aqueous liquid (e.g., water). Representative examples of biomass feedstocks can include plants, algae (e.g., macroalgae and microalgae), photosynthetic cyanobacteria, animal wastes, food and liquid processing wastes (e.g., meat solids and/or dairy liquids), cellulosic materials such as wood, sewage effluent such as municipal waste water, slurries, pastes, or sludges comprising any of the above materials, or any other organic matter. In certain embodiments, the liquid feedstock can comprise 15% to 30% organic material solids or particulates by mass, and 70% to 85% water by mass. In certain embodiments, the biomass slurry source 12 can comprise a stirrer or agitator to maintain the organic matter in a suspended state in the liquid. In certain embodiments, the ratio of solids to liquid can be adjusted or maintained at specified levels by addition of water and/or organic matter.

In certain embodiments, the pump 14 can be a slurry pump adapted to pump a liquid containing suspended solid particles. For example, in certain embodiments, the pump 14 can be any of various dynamic pumps such as a centrifugal pump, or any of various positive displacement pumps such as a piston pump, a peristaltic pump, a diaphragm pump, or a gear pump, to name a few. In particular embodiments, the pump 14 can be a rotary lobe or diaphragm pump. The pump 14 can be configured to pump or pressurize a biomass slurry stream 16 received from the biomass slurry source 12 from ambient pressure to a first pressure or intermediate pressure $P_1$ that is greater than the ambient pressure. For example, in certain embodiments the first pressure $P_1$ can be from 400 psi (28 bar) to 1,500 psi (103 bar), such as from 500 psi (35 bar) to 1,500 psi (103 bar), 700 psi (48 bar) to 1,200 psi (83 bar), or 800 psi (55 bar) to 1,100 psi (76 bar). In particular embodiments, the pump 14 can pressurize the biomass slurry stream to a first pressure $P_1$ of 1,500 psi (103 bar).

Figure 2:
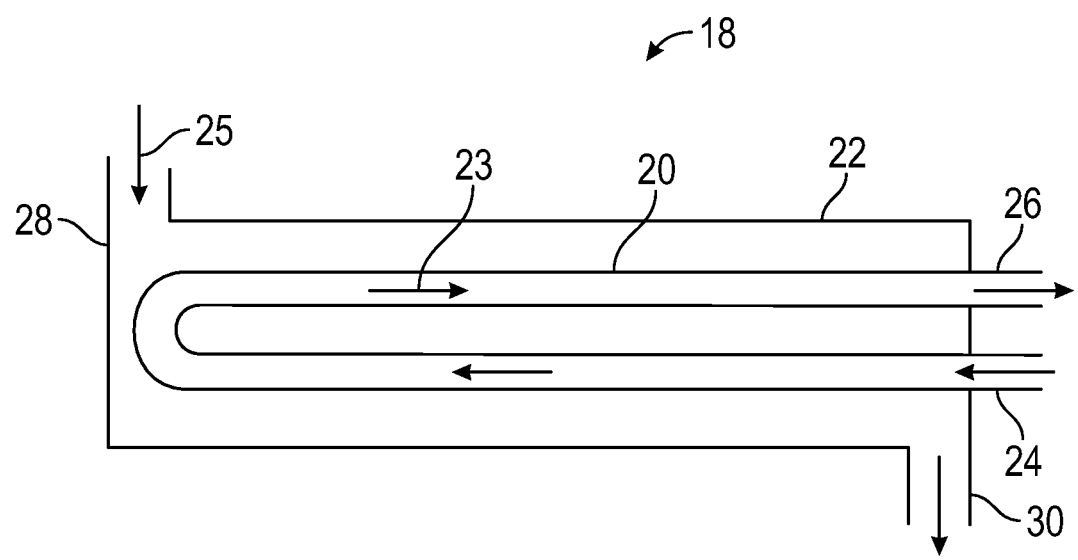
FIG. 2 is a schematic diagram of a heat exchanger, according to one embodiment.

The pump 14 can be in fluid communication with a heat exchanger 18 downstream of the pump 14. The heat exchanger 18 can be configured as any of a variety of heat exchanger types, such as a parallel flow heat exchanger, a counter flow heat exchanger, a shell and tube heat exchanger, or a cross flow heat exchanger, to name a few. Referring to FIG. 2, in certain embodiments the heat exchanger 18 can be configured as a shell and tube heat exchanger comprising a plurality of tubes 20 situated in a shell 22. In the illustrated embodiment the tubes 20 can comprise respective inlets 24 and outlets 26, and the shell 22 can comprise an inlet 28 and an outlet 30. The tubes 20 are shown extending from the inlets 24 along the length of the shell and curving back to the outlets 26, which are on the same end of the shell as the inlets such that the tubes extend through the shell for two "passes." However, the tubes can comprise any number of passes, and the inlets and outlets of the tubes need not be located on the same side of the shell. Flow through the tubes 20 can be in the direction indicated by arrows 23, and flow through the shell can be in the direction indicated by arrows 25, although the flow directions may be reversed. The tubes 20 can comprise any of a variety of metal alloys, such stainless steel (e.g., SS316, SS316L, etc.), carbon steel, or other steel or titanium alloys.

In certain embodiments, the tubes 20 can be the "cold side" of the heat exchanger and configured to receive the liquid to be heated. Thus, returning to FIG. 1, in certain embodiments the tubes 20 can be configured to receive the pressurized biomass slurry stream 32 from the slurry pump 14. The shell 22 can be the "hot side" of the heat exchanger, and can be configured to receive a heat transfer liquid at elevated temperature to heat the biomass slurry stream in the tubes 20, as discussed below.

Figure 3:
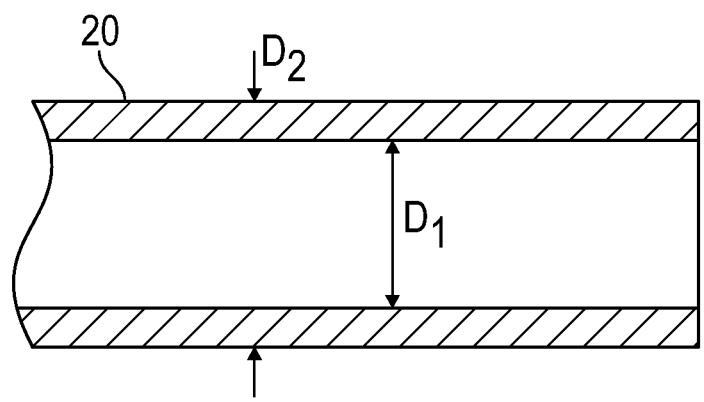
FIG. 3 is a cross-sectional view of a tube of the heat exchanger of FIG. 2, according to one embodiment.

FIG. 3 illustrates a representative tube 20 in cross-section. The tubes 20 can have an inner diameter $D_1$ and an outer diameter $D_2$. The inner and outer diameters, along with the lengths of the tubes, can be selected to permit flow of the biomass slurry through the tubes 20 while limiting pressure loss to at or below a specified threshold, and such that the biomass slurry is heated to a specified temperature. For example, in certain embodiments the inner diameter $D_1$ of the tubes 20 can be from 0.5 inch to 3 inches (1.25 cm to 7.5 cm), such as 0.5 inch to 2 inches (1.25 cm to 5 cm), or 0.75 inch to 1.5 inches (1.875 cm to 3.75 cm). In particular embodiments, the inner diameter $D_1$ of the tubes 20 can be 1 inch. The outer diameter $D_2$ can be 0.7 inch to 3.5 inches, such as 1 inch to 2.5 inches, or 1.2 inches to 1.75 inches. In particular embodiments, the outer diameter $D_2$ of the tubes 20 can be 1.2 inches.

The heat exchanger 18 can be configured to increase the temperature of the biomass slurry from ambient temperature (or a temperature at the outlet of the pump 14) (e.g., 60° F.) to a first temperature or intermediate temperature $T_1$ between the inlets 24 and the outlets 26 of the tubes 20. In certain embodiments, the heat exchanger 18 can be configured to heat the biomass slurry stream to a first temperature $T_1$ of 200° F. to 700° F. (93° C. to 371° C.), such as 300° F. to 600° F. (149° C. to 316° C.), or 350° F. to 550° F. (177° C. to 288° C.). In particular embodiments, the heat exchanger 18 can be configured to heat the biomass slurry stream to a first temperature $T_1$ of 500° F. (260° C.).

The temperature increase of the biomass slurry stream can result in an associated viscosity reduction. For example, at the inlets 24 of the tubes 20, the viscosity of the biomass slurry stream can be 200 cp to 30,000 cp (0.2 pa·s to 30 pa·s), such as 300 cP to 20,000 cP (0.3 pa·s to 20 pa·s), or 500 cP to 15,000 cP (0.5 pa·s to 15 pa·s), depending upon the type(s) if organic matter in the slurry, the particle size, the water content, and/or the presence and quantity of other non-organic solids. Upon exiting the heat exchanger 18, the viscosity of the biomass slurry stream can be 300 cP (0.3 pa·s) or less, such as 200 cP (0.2 pa·s) or less, 0.5 cP to 200 cP (0.0005 pa·s to 0.2 pa·s), or 0.5 cP to 100 cP (0.0005 pa·s to 0.1 pa·s). Thus, the viscosity of the heated, pressurized biomass slurry stream exiting the heat exchanger 18 can be significantly lower than at the inlet.

In certain embodiments, at the temperature, pressure, and/or viscosity ranges given above, and in tubes 20 having the diameter ranges given above, flow of the biomass slurry stream through at least an initial portion of the first heat exchanger 18 can be laminar, or substantially laminar. That is, the Reynolds number of the biomass slurry stream in a tube 20 is 2,300 or less, where the Reynolds number can be determined using the formula given below, in which ρ is the density of the fluid, u is the average velocity of the tube in a tube 20, L is a characteristic linear dimension (e.g., the length of a tube pass), μ is the dynamic viscosity of the fluid, and ν is the kinematic viscosity of the fluid.

$$Re = \frac{\rho u L}{\mu} = \frac{uL}{v}$$

As the biomass slurry stream is heated and the viscosity decreases, the Reynolds number can increase such that at the outlets 26 of the tubes 20 the flow can be laminar, in a transition flow regime (e.g., exhibiting a Reynolds number of 2,300 to 2,900), or turbulent (e.g., Reynolds number greater than 2,900).

Returning to FIG. 1, the tubes 20 of the heat exchanger 18 can be in fluid communication with a second pump 34 downstream of the heat exchanger 18. The pump 34 can be, for example, any of various dynamic pumps such as a centrifugal pump, or any of various positive displacement pumps such as a piston pump, a peristaltic pump, a diaphragm pump, or a gear pump as described above, depending upon the specified flow rate, temperature, and pressure of the reactor system. The pump 34 can be configured to receive a pressurized, heated biomass slurry stream 36 from the heat exchanger 18, and pressurize the stream to a second pressure $P_2$ that is higher than the first pressure $P_1$. For example, in certain embodiments the pump 34 can be configured to receive the biomass slurry stream at a temperature of 200° F. (93° C.) or above, such as 300° F. (150° C.) or above, and pressurize the stream to a second pressure $P_2$ of 2,000 psi to 4,000 psi (138 bar to 275 bar), such as 2,500 psi to 3,500 psi (172 bar to 242 bar), or 3,000 psi to 3,500 psi (207 bar to 242 bar). In particular embodiments, the pump 34 can be configured to pressurize the stream to a second pressure $P_2$ of 3,100 psi (214 bar). In certain embodiments, the biomass slurry stream exiting the pump 34 can have the same or a similar viscosity as upon exiting the heat exchanger 18.

In particular embodiments, the pump 34 can be configured to handle abrasive liquids at elevated temperatures. For example, in certain embodiments the pump 34 can be an ebullated bed recycle pump or a pump of similar construction/performance.

Figure 4:
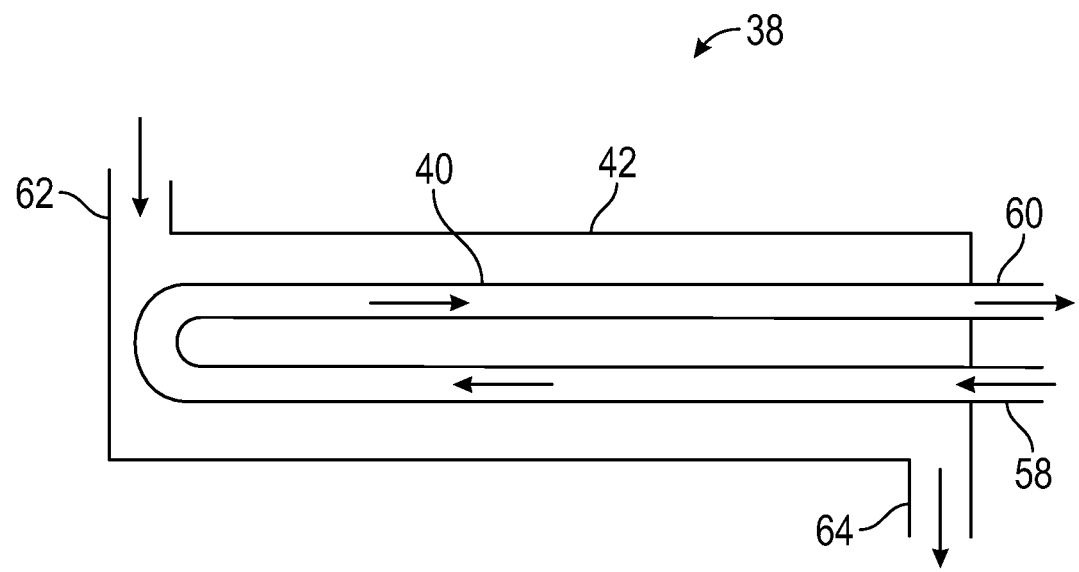
FIG. 4 is a schematic diagram of a heat exchanger, according to another embodiment.

The pump 34 can be in fluid communication with a second heat exchanger 38 downstream of the pump 34. In certain embodiments, the heat exchanger 38 can be a shell and tube heat exchanger configured similarly to the heat exchanger 18, but can be configured as any type of heat exchanger described herein depending upon the particular requirements of the system. Referring to FIG. 4, the heat exchanger 38 can comprise a plurality of tubes 40 arranged in a shell 42, similar to the heat exchanger 18. The tubes 40 can extend between respective inlets 58 and outlets 60. The shell 42 can comprise an inlet 62 and an outlet 64.

Figure 5:
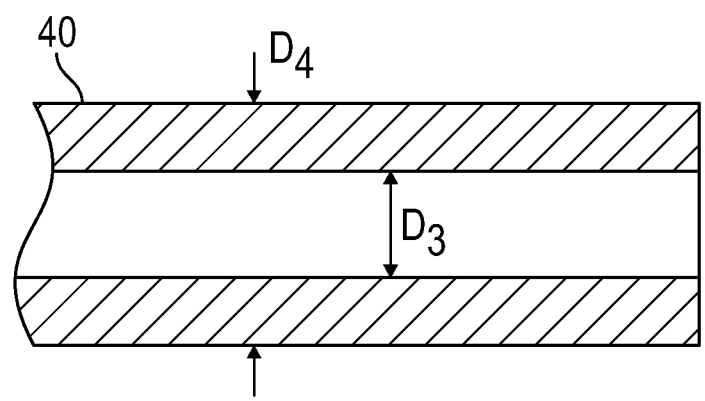
FIG. 5 is a cross-sectional view of a tube of the heat exchanger of FIG. 4, according to one embodiment.

Referring to FIG. 5, the tubes 40 can have an inner diameter $D_3$ and an outer diameter $D_4$. In certain embodiments, the inner diameter of the tubes 40 can be smaller than the tubes 20 of the first heat exchanger 18, and the pipe walls can be thicker to accommodate increased pressure. Thus, in certain embodiments the inner diameter $D_3$ of the tubes 40 can be 0.25 inch to 0.75 inch (0.6 cm to 2 cm), such as 0.25 inch to 0.5 inch (0.6 cm to 1.3 cm). The outer diameter $D_4$ can be 0.33 inch to 1 inch (0.8 cm to 2.5 cm), such as 0.5 inch to 1 inch (1.3 cm to 2.5 cm). In particular embodiments, the inner diameter $D_3$ can be 0.35 inch (0.9 cm), and the outer diameter $D_4$ can be 0.75 inch (2 cm). The tubes 40 can comprise stainless steel, carbon steel, or any of the other metals or metal alloys listed herein.

Returning to FIG. 1, the heat exchanger 38 can be configured to increase the temperature of a biomass slurry stream 44 received from the pump 34 from the first temperature $T_1$ (or a temperature at the outlet of the pump 34) (e.g., 513° F.) (267° C.) to a second temperature $T_2$. In certain embodiments, the heat exchanger 38 can be configured to heat the biomass slurry stream to a second temperature $T_2$ of 400° F. to 900° F. (204° C. to 482° C.), such as 500° F. to 800° F. (260° C. to 427° C.), or 500° F. to 700° F. (260° C. to 372° C.). In particular embodiments, the heat exchanger 38 can be configured to heat the biomass slurry stream to a second temperature $T_2$ of 630° F. (332° C.).

In certain embodiments, at the temperature ranges given above for $T_2$, the pressure ranges given above for $P_2$, and/or the viscosity ranges given above upon exiting the pump 34, and in tubes 40 having the diameter ranges given above, flow of the biomass slurry stream through the second heat exchanger 38 can be turbulent, or substantially turbulent. That is, the Reynolds number of the biomass slurry stream along a determined in a tube 40 according to the formula above can be 2,900 or greater. As the biomass slurry stream is heated, the viscosity can further decrease resulting in a turbulent flow regime along the entire length or nearly the entire length of the tubes 40, with the associated increase in heat transfer from the heat transfer liquid in the shell to the biomass slurry stream.

In certain embodiments, the system can further comprise a heater configured as a trim heater 46 downstream of and in fluid communication with the heat exchanger 38. The trim heater 46 can be, for example, an electrical resistance heater, a gas heater, or any other type of heater depending upon the performance requirements of the system, and can be configured to heat a biomass slurry stream 48 received from the heat exchanger 38 to a third temperature $T_3$. In certain embodiments, the temperature $T_3$ can be from 640° F. to 750° F. (338° C. to 400° C.). A biomass slurry stream 50 can then flow from the trim heater 46 to a HTL reactor schematically illustrated at 52, where the organic matter in the biomass slurry can be converted to biocrude, gases, and other reaction products.

The HTL reactor 52 can be any of various HTL reactors, such as a plug-flow reactor, a continuous stirred-tank reactor (CSTR), or a turbulence-induction reactor, in which the organic biomass slurry stream is provided in a super-heated (e.g., subcritical) state and the organic matter is converted to biocrude, gases, and other reaction products in the presence of various catalysts (e.g., sulfided-ruthenium). Further details regarding reactor configurations, chemical processes, and catalysts that can be employed in the reactor 52 can be found in U.S. Pat. Nos. 10,167,430 and 9,758,728, which are incorporated herein by reference.

In certain embodiments, the reactor 52 can be in fluid communication with the heat exchanger 38 and/or the heat exchanger 18 such that a high temperature product stream from the reactor can be provided to the hot sides or shell sides of the heat exchangers to heat the biomass slurry stream. For example, referring again to FIG. 1 a product stream 54 comprising, for example, biocrude, water, gas, and/or other constituents, can exit the reactor 52 and flow through a filter 56 to remove remaining solids from the product stream. In certain embodiments, the solids can be sent for further processing, such as nutrient recovery. The filtered product stream can then be provided to the shell side of the heat exchanger 38 (e.g., via the inlet 62), where it can heat the biomass stream 44 in the tubes 40. In certain embodiments, the product stream can be provided to the second heat exchanger 38 at a temperature of 400° F. to 900° F. (200° C. to 485° C.). Flowing the product stream through the heat exchanger 38 can lower the temperature of the product stream from 900° F. to 400° F. (485° C. to 200° C.), such as 750° F. to 500° F. (400° C. to 260° C.) or 600° F. to 500° F. (315° C. to 260° C.).

The shells of the heat exchangers 18 and 38 can be connected in series such that upon exiting the heat exchanger 38, the product stream can then flow into the shell 22 of the heat exchanger 18 via the inlet 28 (FIG. 2) where it can heat the biomass slurry stream 32 in the tubes 20. In certain embodiments, the product stream can flow into the heat exchanger 18 at a temperature of 300° F. to 600° F. (149° C. to 316° C.). Upon exiting the heat exchanger 18, the product stream can then flow through one or a series of additional heat exchangers or coolers for cooling. For example, in the illustrated embodiment the product stream can flow through a heat exchanger configured as an air-to-liquid (e.g., fin and tube) heat exchanger 66, and from there to a water-cooled shell and tube heat exchanger 68.

From the heat exchanger 68, the product stream can flow to a multi-phase (e.g., three-phase) separator apparatus 70, which can separate the product stream into its constituent components. Gas separated from the product stream can be provided to a combustor 72. The aqueous liquid of the product stream can be provided to a waste water treatment system 74, and biocrude separated from the product stream can be provided to an upgrader system 76 for further processing. Further details regarding the separator 70 can be found in U.S. Pat. No. 9,404,063, which is incorporated herein by reference.

Figure 6:
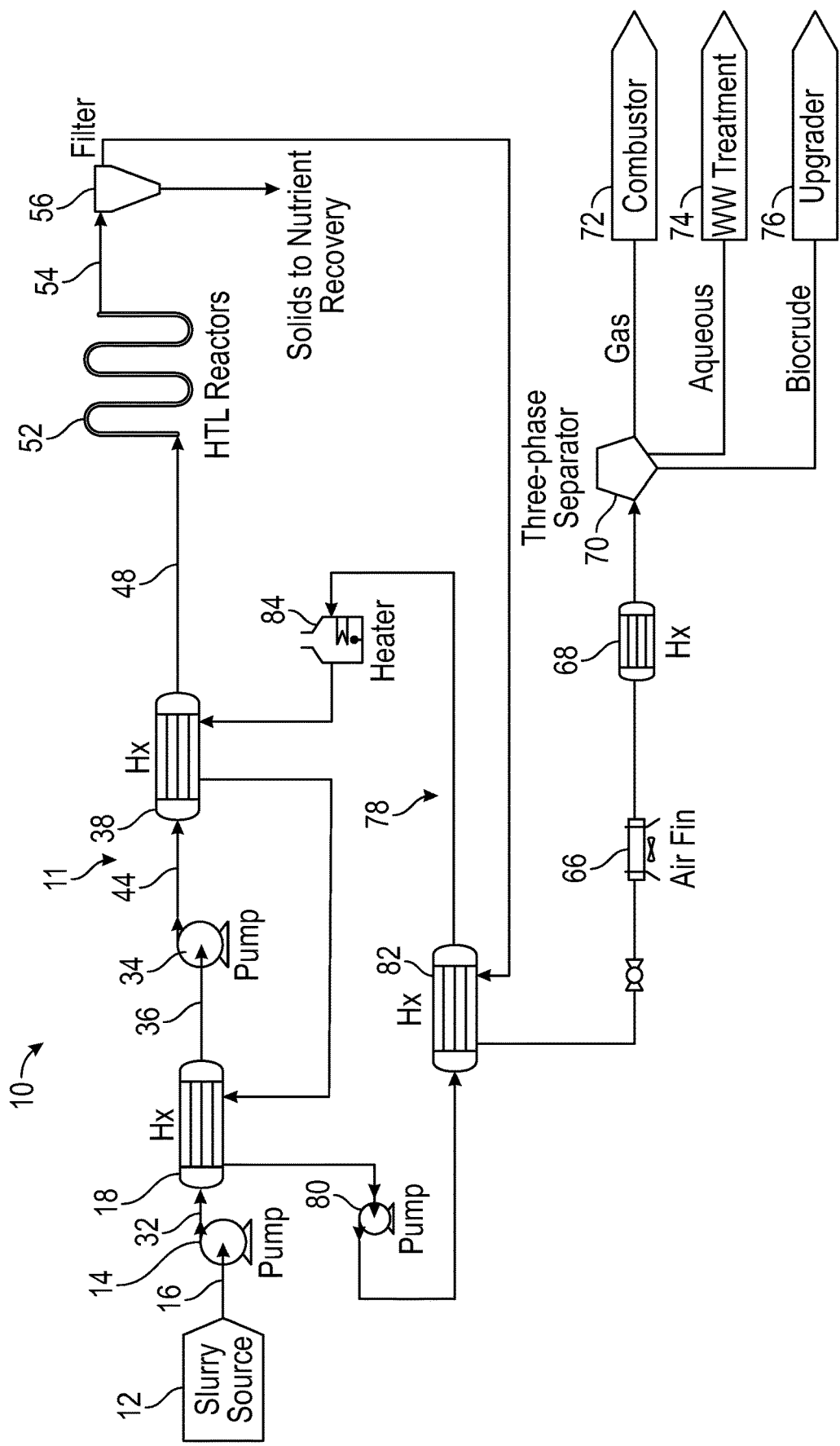
FIG. 6 is a schematic block diagram of a hydrothermal liquefaction system where a product stream is used to heat a heat transfer liquid in a separate liquid circuit, according to one embodiment.

FIG. 6 illustrates another configuration of the HTL reactor system 10 in which the heat transfer liquid provided to the hot sides of the heat exchangers 18 and 38 is a liquid other than the product stream 54 from the reactor 52. The liquid can be provided in a separate liquid circuit 78 comprising a pump 80, a heat exchanger 82, and an optional heater 84. The shells of the heat exchangers 38 and 18 can be a part of the liquid circuit 78 and connected, respectively, in series. The heat transfer liquid in the liquid circuit 78 can be an aqueous liquid, an oil, a liquid metal, or another liquid, depending upon the particular requirements of the system. The pump 80 can pressurize the heat transfer liquid, which can flow to the heat exchanger 82 (e.g., to the tube side), where it can be heated. In the illustrated embodiment, the heat exchanger 82 (e.g., the shell side of the heat exchanger) can be in fluid communication with the reactor 52 and can receive the product stream 54 from the reactor at elevated temperature (e.g., 400° F. to 900° F.). The high temperature product stream 54 can heat the heat transfer liquid in the heat exchanger 82, and can then flow to the heat exchangers 66 and 68 for cooling and further processing, as described above. In certain embodiments, the heat transfer liquid can be heated to a temperature of 600° F. to 750° F. (315° C. to 400° C.), such as 625° F. to 725° F. (330° C. to 385° C.) in the heat exchanger 82. The heated heat transfer liquid can then flow to the heater 84, where it can be further heated to a temperature of 700° F. to 800° F. (370° C. to 430° C.), before flowing to the shell side of the heat exchanger 38. The heat transfer liquid can heat the biomass slurry stream in the heat exchanger 38, and can then flow to the shell side of the heat exchanger 18, before returning to the pump 80. In certain embodiments, the liquid circuit 11 can include a heater similar to the heater 46 between the heat exchanger 38 and the reactor 52, depending upon the particular requirements of the system.

One or more of the HTL reactor systems described herein can provide significant advantages over known systems. For example, in existing HTL reactor systems the capital cost (e.g., design, materials, construction, installation, etc.) of the heat exchanger for heating the biomass slurry is typically the largest expense of the entire project. Counterintuitively, pressurizing and heating the biomass slurry in multiple steps using multiple pumps and heat exchangers arranged alternatingly in series can reduce the capital cost of such equipment by 75% or more as compared to existing HTL reactor systems with a conventional single step pumping and heating configuration, as is typically implemented in fluid chemical processing and high-pressure sludge processes (e.g., supercritical water oxidation and wet air oxidation). In certain embodiments, this can be due to changes in the size, design, and materials of the pumps and heat exchangers enabled by reduced pressure and temperature operating ranges of the equipment. Pressurizing and heating the biomass slurry in multiple stages can also result in significant efficiency gains.

For example, by pressurizing the biomass slurry to an intermediate pressure below the pressure at which the HTL reaction takes place (e.g., 50% of the reactor pressure or less), the first heat exchanger 18 need only be configured to handle the biomass slurry at these relatively low temperatures and pressures. This can significantly reduce the tube and shell thicknesses required, resulting in a reduction of the tube and shell material quantities by 70% to 95% as compared to existing systems. For example, in a conventional system including a single pump and a single heat exchanger, the heat exchanger can require 607 $ft^3$ of metal material, while two heat exchangers configured as described with reference to FIG. 1 can achieve the same or nearly the same performance, and can comprise 161 $ft^3$ of metal material in total, 26% of the metal material of the heat exchanger in the conventional system.

Systems using a liquid other than the product stream as a heat transfer medium, such as the system of FIG. 6, can achieve even greater material reduction compared to comparable existing systems. For example, the single heat exchanger of a conventional hot oil system can require 838 $ft^3$ of metal material, while a system including two heat exchangers configured as described with reference to FIG. 6 can achieve similar performance using 148 $ft^3$ of metal material total, or less than 20% of the metal volume required for the heat exchanger of the conventional system.

Additionally, due to the lower intermediate pump pressure in the first pumping step, the size of the high-performance slurry pump 14 can be reduced as compared to existing systems. This can result in significant cost savings and increased pumping efficiency. Additionally, although the biomass slurry is relatively viscous when it enters the first heat exchanger 18, the relatively low pressure of the slurry permits the use of relatively large tube diameters in a laminar flow regime, which contributes to the significantly lower material and construction costs noted above.

The second pump 34 can also offer additional cost savings and efficiency gains. Because the viscosity of the biomass slurry is significantly lower upon exiting the heat exchanger 18, the second pump 34 need only be configured to handle a high temperature, low viscosity liquid (e.g., a Newtonian liquid) instead of a high temperature, highly viscous liquid. Moreover, the pressure gain needed to attain the specified reactor pressure is more modest, resulting in additional cost savings related to pump construction, and increased pumping efficiency. Additionally, since the viscosity of the biomass slurry can be relatively low upon exiting the heat exchanger 18 and/or the second pump 34, the second heat exchanger 38 can be configured to handle a high pressure, low viscosity media, which can contribute to the lower material quantities required to construct the second heat exchanger noted above. The turbulent flow regime achievable with the biomass slurry in the tubes of the heat exchanger 34 can also result in significant improvements in heat transfer.

Figure 7:
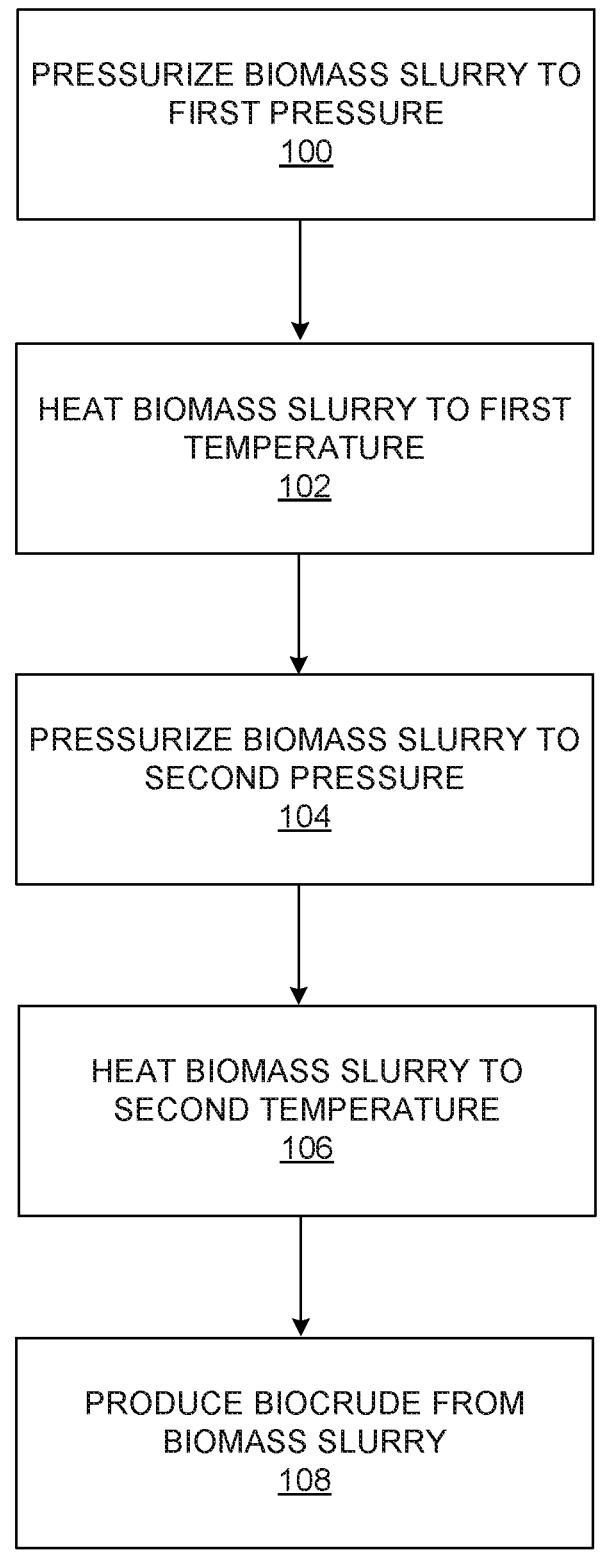
FIG. 7 is a process flow diagram illustrating a method of producing biocrude in a hydrothermal liquefaction reactor system, according to one embodiment.

Referring to FIG. 7, a method of producing biocrude using multiple pressurization and heating steps can comprise pressurizing a biomass slurry stream from a biomass slurry source to a first pressure at block 100, and heating the biomass slurry stream at the first pressure to a first temperature in a first heat exchanger at block 102. The method can further comprise pressurizing the biomass slurry stream at the first temperature to a second pressure that is greater than the first pressure at block 104, and heating the biomass slurry stream at the second pressure to a second temperature that is greater than the first temperature in a second heat exchanger at block 106. The method can further comprise producing biocrude from the biomass slurry stream at block 108.

Although the heat exchangers 18 and 38 are shown and described herein as separate structures, in practice the heat exchangers can be incorporated into a single piece of machinery with the pump 34 interposed at a suitable location, or can be separate, depending upon the particular requirements of the system.

In certain embodiments, any or all of the pump 13, the heat exchanger 18, the pump 34, the heat exchanger 38, and/or the reactor 52 can comprise multiple units arranged in parallel, depending upon the flow rate of the system. Any of the systems described herein can also include more than two pumping steps (such as three pumping steps, four pumping steps, five pumping steps, etc.), and/or more than two heating steps (such as three heating steps, four heating steps, five heating steps, etc.), and such pumping and heating steps may be alternating as described above, or provided in any other sequence.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims. We therefore claim all that comes within the scope and spirit of these claims.

The invention claimed is:
1. A system, comprising:
a biomass slurry source;
a first pump in fluid communication with the biomass slurry source and configured to pressurize a biomass slurry stream from the biomass slurry source to a first pressure;
a first heat exchanger in fluid communication with the first pump and configured to heat a biomass slurry stream received from the first pump at the first pressure to a first temperature;
a second pump in fluid communication with the first heat exchanger and configured to pressurize a biomass slurry stream received from the first heat exchanger at the first temperature to a second pressure that is higher than the first pressure;
a second heat exchanger in fluid communication with the second pump and configured to heat a biomass slurry stream received from the second pump at the second pressure to a second temperature that is higher than the first temperature;

a hydrothermal liquefaction (HTL) reactor in fluid communication with the second heat exchanger and configured to produce a product mixture stream including biocrude from a biomass slurry stream received from the second heat exchanger;

a third heat exchanger configured to receive the product mixture stream from the HTL reactor to heat a heat transfer liquid;

wherein the second heat exchanger is in fluid communication with the third heat exchanger and configured to receive a heat transfer liquid stream from the third heat exchanger to heat the biomass slurry stream received from the second pump;

wherein the first heat exchanger is in fluid communication with the second heat exchanger and configured to receive a heat transfer liquid stream from the second heat exchanger to heat the biomass slurry stream received from the first pump; and wherein the first heat exchanger is in fluid communication with the third heat exchanger such that a heat transfer liquid stream from the first heat exchanger flows back to the third heat exchanger.

2. The system of claim 1, wherein:
the first pressure is from 500 psi to 1,500 psi; and
the first temperature is from 300° F. to 600° F.

3. The system of claim 2, wherein:
the first heat exchanger comprises a shell and a plurality of tubes disposed in the shell;
an inner diameter of the tubes is from 0.5 inch to 2 inches; and
a viscosity of the biomass slurry stream received from the first pump is from 300 cP to 20,000 cP such that flow of the biomass slurry in the tubes is laminar.

4. The system of claim 3, wherein the first pump is a slurry pump configured to pump a biomass slurry mixture comprising 15% solids to 30% solids in water.

5. The system of claim 1, wherein:
the second pressure is 2,500 psi to 3,500 psi; and
the second temperature is 400° F. to 700° F.

6. The system of claim 5, wherein:
the second heat exchanger comprises a shell and a plurality of tubes disposed in the shell;
an inner diameter of the tubes is from 0.25 inch to 0.5 inch; and
a viscosity of the biomass slurry stream received from the second pump is 300 cP or less such that flow of the biomass slurry in the tubes is turbulent.

7. The system of claim 5, wherein the second pump is configured to pump abrasive slurries at a temperature of 200° F. or greater.

8. The system of claim 1, wherein:
the third heat exchanger is configured to receive the product mixture stream from the HTL reactor at a temperature of 400° F. to 900° F.

9. A method, comprising:
pressurizing a biomass slurry stream from a biomass slurry source to a first pressure;
in a first heat exchanger, heating the biomass slurry stream at the first pressure to a first temperature;
pressurizing the biomass slurry stream at the first temperature to a second pressure that is greater than the first pressure;

in a second heat exchanger, heating the biomass slurry stream at the second pressure to a second temperature that is greater than the first temperature;

flowing the biomass slurry stream at the second pressure and the second temperature from the second heat exchanger through a hydrothermal liquefaction (HTL) reactor to produce a product mixture stream including biocrude;

flowing the product mixture stream from the HTL reactor through a third heat exchanger configured to heat a heat transfer liquid;

flowing the heat transfer liquid from the third heat exchanger through the second heat exchanger to heat the biomass slurry stream to the second temperature; and flowing the heat transfer liquid from the second heat exchanger through the first heat exchanger to heat the biomass slurry stream to the first temperature, and from the first heat exchanger back to the third heat exchanger.

10. The method of claim 9, wherein pressurizing the biomass slurry stream to the first pressure further comprises pressurizing the biomass slurry stream to a first pressure of 500 psi to 1,500 psi with a slurry pump.

11. The method of claim 10, wherein heating the biomass slurry stream to the first temperature further comprises flowing the biomass slurry stream through the first heat exchanger at the first pressure to heat the biomass slurry stream to a temperature of 300° F. to 600° F.

12. The method of claim 11, wherein:
the first heat exchanger comprises a shell and a plurality of tubes disposed in the shell;
an inner diameter of the tubes is from 0.5 inch to 2 inches; and
heating the biomass slurry stream further comprises flowing the biomass slurry stream through the tubes of the first heat exchanger to heat the biomass slurry stream from ambient temperature to a temperature of 300° F. to 600° F. such that a viscosity of the biomass slurry stream is reduced to 300 cP or less in the first heat exchanger.

13. The method of claim 12, wherein pressurizing the biomass slurry stream at the first temperature to the second pressure further comprises pressurizing the biomass slurry stream to a second pressure of 2,500 psi to 3,500 psi.

14. The method of claim 13, wherein heating the biomass slurry stream to the second temperature further comprises flowing the biomass slurry stream through the second heat exchanger at the second pressure to heat the biomass slurry stream to a second temperature of 400° F. to 700° F.

15. The method of claim 14, wherein:
the second heat exchanger comprises a shell and a plurality of tubes disposed in the shell;
an inner diameter of the tubes is from 0.25 inch to 0.5 inch; and
flowing the biomass slurry stream through the second heat exchanger further comprises flowing the biomass slurry stream at a viscosity of 300 cP or less such that flow of the biomass slurry stream in the tubes is turbulent.

16. The method of claim 9, wherein the first heat exchanger comprises a shell and a plurality of tubes disposed in the shell, and the plurality of tubes and the shell of the first heat exchanger are configured to handle liquids at or below the first pressure.

17. The method of claim 9, further comprising:
pressurizing the heat transfer liquid with a third pump prior to flowing the heat transfer liquid through the third heat exchanger; and
prior to flowing the heat transfer liquid through the second heat exchanger, heating the heat transfer liquid with a heater.

18. The method of claim 17, wherein:
the third heat exchanger is configured to heat the heat transfer liquid to a temperature of 600° F. to 750° F.; and
the heater is configured to heat the heat transfer liquid to a temperature of 700° F. to 800° F.

19. The method of claim 9, wherein the biomass slurry stream from the second heat exchanger flows directly to the HTL reactor.

20. The method of claim 11, wherein:
the biomass slurry stream comprises sewage sludge comprising 15% to 30% organic material solids by mass; and
heating the biomass slurry stream to the first temperature further comprises flowing the biomass slurry stream through the first heat exchanger at the first pressure to heat the biomass slurry stream from ambient temperature to a temperature of 350° F. to 550° F. such that a viscosity of the biomass slurry stream is reduced to 300 cP or less.

21. A hydrothermal liquefaction system, comprising:
a first liquid circuit, comprising:
a biomass slurry source;
a first pump in fluid communication with the biomass slurry source and configured to pressurize a biomass slurry stream from the biomass slurry source to a first pressure;
a first heat exchanger in fluid communication with the first pump and configured to heat a biomass slurry stream received from the first pump at the first pressure to a first temperature;
a second pump in fluid communication with the first heat exchanger and configured to pressurize a biomass slurry stream received from the first heat exchanger at the first temperature to a second pressure that is higher than the first pressure;
a second heat exchanger in fluid communication with the second pump and configured to heat a biomass slurry stream received from the second pump at the second pressure to a second temperature that is higher than the first temperature; and
a hydrothermal liquefaction (HTL) reactor in fluid communication with the second heat exchanger and configured to produce a product mixture stream including biocrude from a biomass slurry stream received from the second heat exchanger; and
a second liquid circuit comprising a third heat exchanger configured to receive the product mixture stream from the HTL reactor to heat a heat transfer liquid, the third heat exchanger being in fluid communication with the second heat exchanger and the first heat exchanger in series such that the heat transfer liquid flows from the third heat exchanger, through the second heat exchanger, through the first heat exchanger, and back to the third heat exchanger to heat the biomass slurry streams in the first liquid circuit.

\* \* \* \* \*

UNITED STATES PATENT AND TRADEMARK OFFICE
CERTIFICATE OF CORRECTION

PATENT NO. : 11,279,882 B2
APPLICATION NO. : 16/740339
DATED : March 22, 2022
INVENTOR(S) : Thorson et al.

It is certified that error appears in the above-identified patent and that said Letters Patent is hereby corrected as shown below:

In the Specification

Column 2, Line 7:
"stream received form the second pump" should read --stream received from the second pump--

Column 2, Line 25:
"received form the second pump" should read --received from the second pump--

Column 8, Lines 25-26:
"the Reynolds number of the biomass slurry stream along a determined in a tube 40" should read --the Reynolds number of the biomass slurry stream in a tube 40--

Signed and Sealed this
Twenty-first Day of March, 2023

Katherine Kelly Vidal
*Director of the United States Patent and Trademark Office*